United States Patent [19]
Burtin et al.

[11] Patent Number: 5,847,945
[45] Date of Patent: Dec. 8, 1998

[54] PROCESSES, DEVICE FOR PRODUCING A HIGH VOLTAGE AND INSTALLATION FOR ELECTROSTATIC SPRAYING OF A COATING PRODUCT

[75] Inventors: Jean-Pierre Burtin, Saint-Egreve; Flavien Dobrowolski, Sinard; Caryl Thome, Saint-Egreve, all of France

[73] Assignee: SAMES S.A., Meylan, France

[21] Appl. No.: 678,037

[22] Filed: Jul. 10, 1996

[30] Foreign Application Priority Data

Jul. 10, 1995 [FR] France ................................ 95 08621

[51] Int. Cl.⁶ .............................. H02M 3/18; B05D 3/14
[52] U.S. Cl. .................................... 363/60; 363/59; 427/8
[58] Field of Search .................................. 363/59, 60, 61, 363/21; 427/8; 323/222, 207, 285; 315/241 R; 361/228, 227, 235

[56] References Cited

U.S. PATENT DOCUMENTS

| | | | |
|---|---|---|---|
| 4,106,084 | 8/1978 | Gibert | 363/21 |
| 4,623,824 | 11/1986 | Scolari et al. | 315/241 R |
| 4,764,393 | 8/1988 | Henger et al. | 427/8 |
| 4,916,571 | 4/1990 | Staheli | 361/227 |
| 5,159,544 | 10/1992 | Hughey et al. | |
| 5,566,042 | 10/1996 | Perkins et al. | 361/228 |

FOREIGN PATENT DOCUMENTS

| | | |
|---|---|---|
| 0185311 | 6/1986 | European Pat. Off. . |
| 2618618 | 1/1989 | France . |
| 9007381 | 7/1990 | WIPO . |

*Primary Examiner*—Peter S. Wong
*Assistant Examiner*—Rajnikant B. Patel
*Attorney, Agent, or Firm*—Pillsbury Madison &Sutro

[57] ABSTRACT

A method and device for monitoring operation of a high voltage generator which converts an input voltage into an output voltage which is higher than the input voltage, by measuring at least one first physical quantity which is representative of the input voltage; deriving at least one parameter from the at least one measured first physical quantity; comparing the at least one parameter with a second measured physical quantity which is representative of the magnitude of the output voltage; and producing a response when a predetermined minimum differential exists between the at least one parameter and the second measured physical quantity.

17 Claims, 2 Drawing Sheets

5,847,945

PROCESSES, DEVICE FOR PRODUCING A HIGH VOLTAGE AND INSTALLATION FOR ELECTROSTATIC SPRAYING OF A COATING PRODUCT

BACKGROUND OF THE INVENTION

The invention concerns processes and a device for producing a high voltage, particularly for electrostatic application of a coating product in an installation for spraying a coating product in liquid or powder form. It also concerns an installation of this type equipped with such a device.

In such installations, which can be manual or automatic, one or several high voltage electrodes must be supplied electrically in order to place them at a high voltage which creates an electrostatic field between a coating product sprayer and the workpiece to be coated. The voltage delivered to such an electrode is of the order of several tens of kilovolts (kV). In order to supply an electrode from power mains or any other conventional voltage source such as a battery, it is necessary to substantially increase the input voltage. The current to and from the high voltage electrode is generally limited to several milliamps for safety reasons and to limit the electric power consumed by the electrode, this power being partially dissipated in the form of heat in the device.

The electrode is most often supplied by two subsystems, one disposed in a fixed location located in proximity to the installation and normally termed "low voltage unit", and the other forming a unit with the sprayer and referred to herein as a "rectifier-step-up transformer". These two units are connected together by a bundle of conductive cables.

The magnitude of the high voltage utilized in such an installation must vary, during use of the installation, as a function of the geometry of the surface to be coated, the rate of flow of the coating product, the relative positions of objects to be coated and product sprayers, etc. The operator of a coating installation can vary this magnitude manually or can program the desired values for the high voltage to be furnished to the, or each, electrode by controlling, for example, the voltage delivered by the low voltage unit. A measurement of the value of the resulting high voltage permits establishment of a closed measurement and control loop, and the supply voltage from the low voltage unit can be adjusted as a function of the measured value of the high voltage.

For a fixed high voltage output, one can apply to the rectifier-step-up transformer a periodic signal having a frequency proximate to its resonant frequency in order to obtain the desired high voltage with a minimal input voltage, which allows heating of the components to be avoided. Systems of this type are disclosed in French Patent Application A-2,618618 and U.S. Pat. No. 5,159,544.

It has been found that known systems of this type are not completely reliable because an error in the measurement of the voltage downstream of the transformer can be provoked by a poor connection or by the introduction of foreign material, such as water, grease, or silicone, or any other material, into the connector or into the solder which serves as a point of contact between the measuring conductor and the line supplying high voltage for the high voltage electrode.

Such an error creates a variation in the supply voltage from the low voltage unit, which can lead to a dangerous condition which exposes the operator to electrocution or the installation to a fire. In addition, an error in the measurement of the output voltage can disturb the implementation of the algorithm which determines the resonant frequency.

Thus, for example, the measured high voltage value can be of the order of 70 kV while the real value available at the electrode is of the order of 120 or 140 kV. If the nominal, or desired, value is 80 kV, the system which controls the installation will have a tendency to raise the supply voltage in order to produce a higher voltage. This being done, there is a risk of exceeding the voltage value which is acceptable for installation safety and of generating a spark which could trigger a fire or could destroy components of the high voltage unit due to heating.

SUMMARY OF THE INVENTION

It is a primary object of the present invention to overcome the above-described problems.

The above and other objects are achieved, according to the present invention, by a method for monitoring operation of a high voltage generator which converts an input voltage into an output voltage which is higher than the input voltage, the method comprising: measuring at least one first physical quantity which is representative of the input voltage; deriving at least one parameter from the at least one measured physical quantity; comparing the at least one parameter with a second measured physical quantity which is representative of the magnitude of the output voltage; and producing a response when a predetermined minimum differential exists between the at least one parameter and the second measured physical quantity.

Objects according to the invention are further achieved by a method for monitoring operation of a high voltage generator which converts an input voltage into an output voltage which is higher than the input voltage, the method comprising: selecting an assigned value for the output voltage; deriving at least one parameter from the assigned value; comparing the at least one parameter with at least one measured physical quantity which is representative of the magnitude of the output voltage; and producing a response when a predetermined minimum differential exists between the at least one parameter and the at least one physical quantity.

Objects according to the invention are additionally achieved by a device for generating a high voltage comprising: means for producing a high voltage in response to an input signal; means for determining a relation between at least one parameter defining the input signal and at least one measured physical quantity representative of the magnitude of the high voltage; and means connected for controlling the magnitude of the high voltage as a function of the relation determined by the determining means.

The processes and devices according to the present invention assure that a measurement error will be immediately detected so that appropriate corrective action can be taken. Such corrective action can include shut-down of the installation and/or triggering of an alarm. The dangers of electrocution and fire are thus avoided.

The physical quantity that is measured can be the output voltage of the rectifier-step-up transformer, the current in the secondary of a transformer supplying the rectifier-step-up transformer, or a combination of these two values. The parameter defining the periodic signal can be its nominal voltage, nominal current, or frequency, the voltage or current supplying the generator of the periodic signal, or a combination of these parameters.

According to an advantageous feature of the invention, a calculator is utilized to compare the measured value with a reference value supplied by a memory or derived according to an algorithm which performs a calculation that is a function of the value of the selected parameter. The differential between the reference value and the measured value permits detection of measurement errors and the calculator acts on a shut-off means or an alarm as a function of this differential and of a fixed threshold value for this differential.

The invention will be better understood and other advantages thereof will become more readily apparent from the following description of two embodiments of a device for producing a high voltage for an installation for electrostatic spraying of a coating product, given solely by way of non-limiting example and with reference to the attached drawings.

DESCRIPTION OF THE PREFERRED EMBODIMENTS

Figure 1:
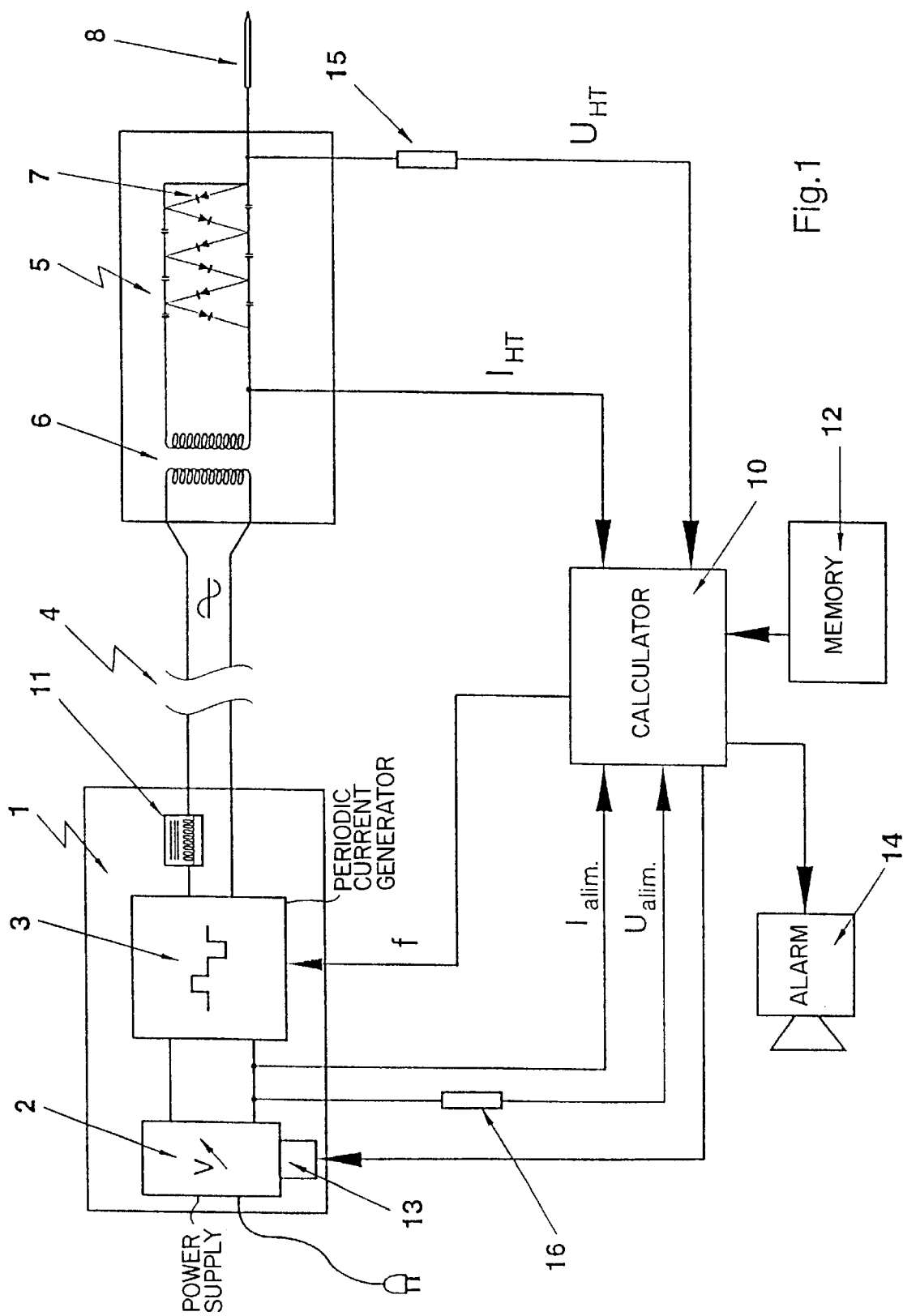
FIG. 1 is a schematic diagram of a high voltage generator device according to the present invention.

The circuit shown in FIG. 1 includes a low voltage unit 1 composed essentially of a regulated power supply 2 which is connected to power mains and which delivers a direct current at an adjustable direct voltage to a generator 3 which produces a periodic electric current at an adjustable frequency, f. Regulated power supply 2 can also receive input power from a battery or any other appropriate current source. The periodic electric signal produced by generator 3 is basically a square wave signal having a constant waveform selected, in a known manner, to minimize first order harmonics, i.e., the waveform is as close as possible to a perfect sinusoid. A filter 11 permits this periodic signal to be partially smoothed. The magnitude of the periodic current signal is variable as a function of the voltage supplied to generator 3 by regulated power supply 2. Although the waveform of the periodic signal as described above is particularly advantageous and simple to implement, any other form of periodic signal can be employed in the practice of the present invention, in particular a true sinusoidal signal.

The periodic current signal produced by low voltage unit 1 is applied through a bundle of flexible conductive cables 4 to the input of a rectifier-step-up transformer unit 5 which comprises an input transformer 6 and a voltage multiplier 7. The output of the voltage multiplier 7 is connected to a high voltage, or live, electrode 8 of an electrostatic sprayer (not shown) for spraying a coating product.

The operator can decide to vary the voltage supplied to electrode 8 as a function of the desired spraying characteristics and/or as a function of the form of the workpieces to be coated. The voltage also varies as a function of high voltage leaks at the level of the electrode, which depend on its environment, for example on the distance to the nearest ground point.

According to the invention, a calculator 10 is connected to a part of the rectifier-step-up transformer 5 and receives two signals representative of the output voltage ($U_{HT}$) of, and the current ($I_{HT}$) in, the rectifier. The voltage $U_{HT}$ is measured across a measuring resistance 15. Calculator 10 also receives input signals representative of the output voltage ($U_{alim}$) and the current ($I_{alim}$) from the regulated power supply 2. The voltage $U_{alim}$ is measured across a measuring resistance 16. As a function of the values for the voltage $U_{HT}$ and the current $I_{HT}$ in the rectifier-step-up transformer 5, calculator 10 can obtain reference values for the voltage ($U_{HTref}$) and the current ($I_{HTref}$) which the rectifier-step-up transformer 5 should provide to electrode 8. In FIG. 1, memory 12 is shown as a component external to calculator 10; however, in practice, memory 12 can be a component part within calculator 10.

Calculator 10 compares at least one of the measured values ($U_{HT}$, $I_{HT}$) with a corresponding reference value ($U_{HTref}$, $I_{HTref}$) and determines the percentage difference between the associated values. If the percentage difference is equal to or less than a selected value which is assumed to be acceptable, for example 20%, the installation is assumed to be operating properly and its operation is maintained. If the percentage difference is greater than the selected value, calculator 10 activates a malfunction procedure which comprises operating a means 13 for shutting off operation of the low voltage unit. In the case of a regulated power supply 2 connected to power supply mains, the means 13 is a switch. Simultaneously with, or in place of, operation of shut-off means 13, calculator 10 can also trigger an alarm 14 in order to warn the operator of the occurrence of the malfunction.

The threshold value for initiating a malfunction procedure is determined by the characteristics of the installation. The value of 20% is given above solely by way of example and any value between 0% and 1000% can be chosen.

The comparison described above takes place continually at a frequency linked to the operating speed of calculator 10, of the order of 50 kHz, given that calculator 10 is permanently connected to low voltage unit 1 and rectifier-step-up transformer 5. Taking into account the transient conditions existing during start-up of power supply 2 and the substantial variations which can occur at that time, monitoring of the measured high voltage and associated current values is not effected during a predetermined period after each start-up. In practice, this period can be fixed at several tens of milliseconds, up to one second.

Figure 2:
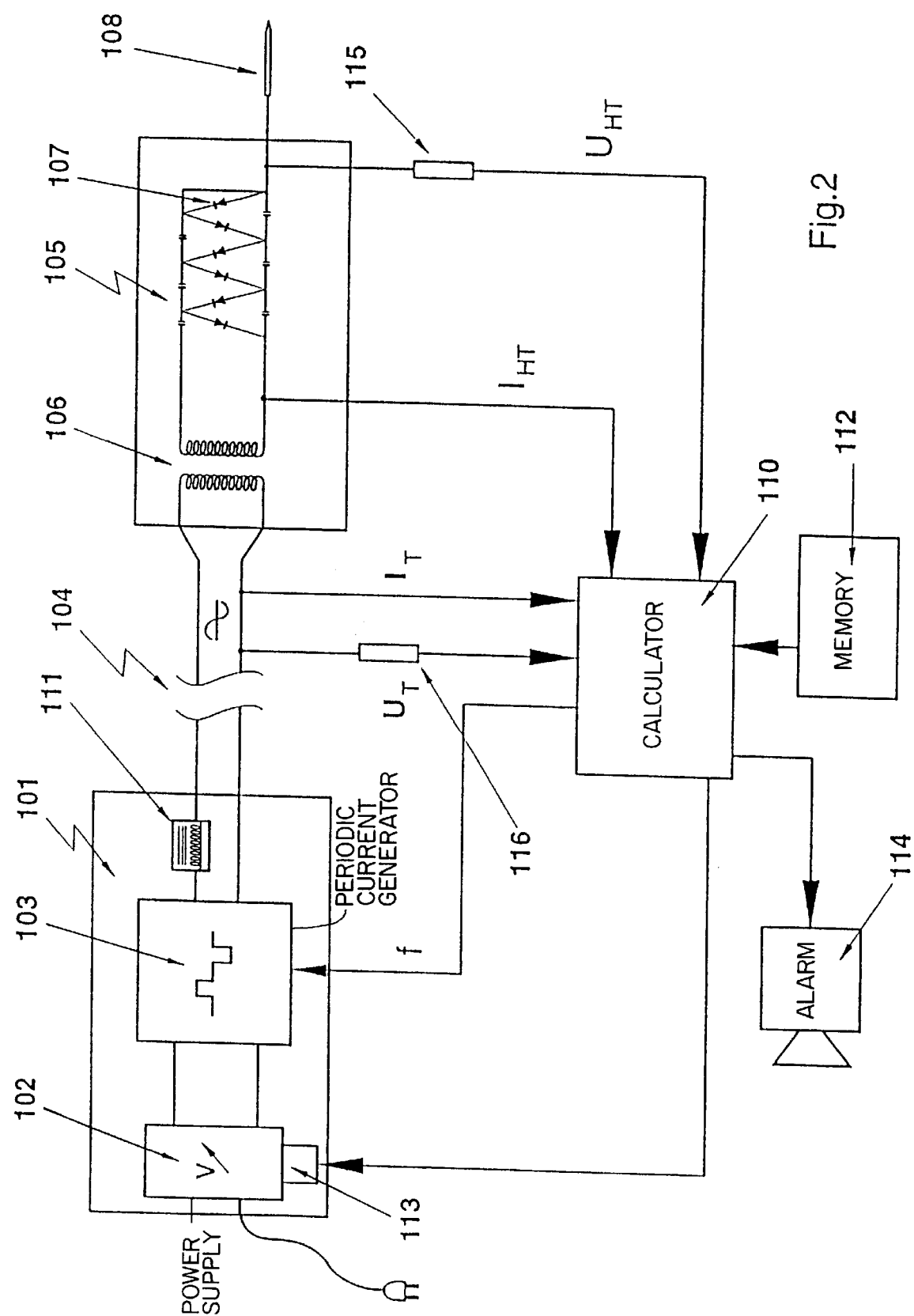
FIG. 2 is a diagram similar to that of FIG. 1 showing a second embodiment of the invention.

FIG. 2 shows a variant of the embodiment of FIG. 1 in which elements identical to those of FIG. 1 have the same reference numerals increased by 100. The high voltage, $U_{HT}$, and the associated current, $I_{HT}$, in rectifier-step-up transformer 105 are measured and transmitted to calculator 10 which adjusts the value of the direct voltage delivered by regulated power supply 102 and the value of the frequency, f, of the periodic current supplied by generator 103 until the high voltage achieves a desired value, $U_{des}$ defined by the operator via a keyboard 112. The system thus comprises a regulation loop.

On the other hand, the voltage, $U_T$ between the cables in bundle 104, and the current $I_T$ being conducted by those cables are measured and furnished as input values to calculator 110. Starting from the desired value, $U_{des}$, and theoretically or experimentally determined physical laws, calculator 110 is arranged to determine theoretical values, $U_{Tcalc}$, $I_{Tcalc}$, for the voltage $U_T$ and the current $I_T$ in the bundle of cables 104.

For example, the voltage across the secondary of transformer 106 could be expressed as $$U_{sec} = K_1 \times U_T$$

where $K_1$ is a numerical coefficient dependent on the characteristics of transformer 106.

The voltage drop in rectifier-step-up transformer 105 has the form:

$$\Delta U = \frac{I_{HT}}{f \times c} \times (2/3N^3 + 1/2N^2 - 1/6N)$$

where f is the frequency of the periodic signal provided by generator 103; C is the unitary value of the capacitance of each of the capacitors in rectifier 107, and
N is the number of voltage doubling stages in rectifier 107; in the illustrated embodiment, rectifier 107 contains three voltage doubling stages.

The following may be noted:

$$\Delta U = K_2 \times I_{HT}$$

where $K_2$ is a constant numerical coefficient characteristic of the type of cascade employed.

The value for the output voltage from rectifier-step-up transformer 105 is a multiple of the voltage across the secondary of transformer 106, the multiplying coefficient, $K_3$, being the voltage gain of the cascade. The high voltage at the output of the rectifier can be expressed as a function of the other values as follows:

$$U_{HT} = K_3 \times U_{sec} - \Delta U = K_1 \times K_3 \times U_T - K_2 \times I_{HT}.$$

When the value of $U_{HT}$ must be equal to the desired value, $U_{des}$, and when $I_{HT}$ is known, the calculated value for $U_T$ is obtained by solving the following first order equation:

$$U_{Tcalc} = (U_{des} + K_2 \times I_{HT})/(K_1 \times K_3).$$

The comparison between $U_{Tcalc}$ and $U_T$ permits a determination to be made of whether the generator is functioning in an abnormal manner. One can proceed as in the embodiment of FIG. 1 by detecting a malfunction when the difference between the calculated value, $U_{Tcalc}$, and the measured value, $U_T$ exceeds a given percentage and a given difference in volts, for example 5 V. In the same manner, the comparison can be made between $I_{Tcalc}$ and $I_T$. It is to be noted that, in this embodiment, a measurement is not performed directly on the high voltage produced in rectifier-step-up transformer 105 because the malfunction measurement is performed independently of the regulation loop. A poor contact within the measurement line, because of the lower level of $U_T$, thus does not significantly influence the reliability of the malfunction detection.

According to another embodiment of the invention, which is not shown, the frequency, f, of the periodic signal produced by generator 103 can also be used as one of the parameters defining the periodic signal. In effect, this frequency has a relation to the other measured physical quantities because it is related to the gain of the rectifier-step-up transformer.

The invention can be implemented by comparing only one measured physical quantity with only one reference value, the reference value being determined as a function of one or several parameters which determine the periodic signal. In effect, for example, the output voltage depends on a combination of the supply voltage, the supply current and the frequency of the periodic signal.

In the embodiments of the invention described herein, the low voltage unit 1 is physically separated from the rectifier-step-up transformer 5 and is connected thereto by a bundle of flexible cables 4. However, the invention can also be applied to arrangements in which these subassemblies form part of an integrated or compact system.

This application relates to subject matter disclosed in Application number 95 08621, filed on Jul. 10, 1995 in France, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method for spraying a coating product, said method comprising:

operating a high voltage generator to convert an input voltage into an output voltage which is higher than the input voltage;

electrostatically charging the coating product with the output voltage;

measuring at least one first physical quantity which is representative of the input voltage;

deriving at least one parameter from the at least one measured physical quantity;

comparing the at least one parameter with a second measured physical quantity which is representative of the magnitude of the output voltage;

producing a response when at least a predetermined minimum differential exists between the at least one parameter and the second measured physical quantity; and spraying the coating product which has been electrostatically charged.

2. A method for spraying a coating product, said method comprising:

operating a high voltage generator to convert an input voltage into an output voltage which is higher than the input voltage;

electrostatically charging the coating product with the output voltage;

selecting an assigned value for the output voltage;

deriving at least one parameter from the assigned value;

comparing the at least one parameter with at least one measured physical quantity which is representative of the magnitude of the output voltage;

producing a response when at least a predetermined minimum differential exists between the at least one parameter and the at least one physical quantity; and spraying the coating product which has been electrostatically charged.

3. In an installation for spraying an electrostatically charged coating product, which installation includes a device for generating a high voltage in response to an input signal, the high voltage having a magnitude which is a given function of a parameter of the input signal, means for electrostatically charging the coating product with the high voltage, and means for spraying the electrostatically charged coating product, the improvement wherein said installation further comprises:

means for measuring a physical quantity representative of the magnitude of the high voltage; and means for identifying correspondence between the high voltage magnitude which is the given function of the parameter of the input signal and the high voltage magnitude represented by the measured physical quantity.

4. A method for spraying a coating product, said method comprising:

providing a high voltage generator which has a low voltage unit that produces a low voltage signal and a high voltage unit that produces an output voltage in response to the low voltage signal;

measuring the magnitude of the output voltage produced by the high voltage unit;

measuring at least one parameter defining the low voltage signal;

deriving from the measured parameter a desired value for the magnitude of the output voltage;

producing a response when at least a predetermined minimum differential exists between the measured magnitude and the desired value of the magnitude of the output voltage; and electrostatically charging the coating product with the output voltage and spraying the coating product when no response has been produced.

5. A method for generating and monitoring an electrostatic charging voltage in a coating product spraying installation, said method comprising:

generating a low voltage signal;

generating a high voltage in response to, and as a given function of, the low voltage signal;

deriving a measured value representing the magnitude of the high voltage and controlling the low voltage signal in response to the measured value in a manner to cause the high voltage to have a desired magnitude; and monitoring the step of generating a high voltage by
measuring a parameter representative of the low voltage signal and a parameter representative of the high voltage;
calculating, on the basis of one of the measured parameters, an expected value which the other parameter would have when the measured value representing the magnitude of the high voltage is being accurately derived;
determining whether the other measured parameter is consistent with the expected value; and using the high voltage as the electrostatic charging voltage.

6. The method according to claim 1 wherein the input voltage is constituted by a periodic signal produced by a low voltage unit and the generator is a rectifier-step-up transformer device.

7. The method according to claim 6 wherein the at least one measured physical quantity is one of the output voltage and the current associated with the output voltage.

8. The method according to claim 2 wherein the input voltage is constituted by a periodic signal produced by a low voltage unit and the generator is a rectifier-step-up transformer device.

9. The method according to claim 8 wherein the measured physical quantity is one of the voltage and the current of the periodic signal.

10. The method according to claim 8 wherein the parameter is the frequency of the periodic signal.

11. The installation according to claim 3 further comprising a low voltage unit which is provided with a supply voltage and associated supply current to produce the input signal, and wherein said means for producing a high voltage comprise a rectifier-step-up transformer, and said means for determining comprise: a calculator having inputs connected for receiving signals representing the high voltage and associated high voltage current, the supply voltage and the supply current; and a memory storing reference values for one of the high voltage and associated high voltage current, which reference values are given functions of a respective one of the supply voltage and the supply current.

12. The installation according to claim 3 wherein said means for producing a high voltage comprise a rectifier-step-up transformer connected to receive the input signal, the input signal has an associated input voltage and input current, and said means for determining comprise: a calculator having inputs connected for receiving signals representing the input voltage and input current; and means for supplying said calculator with a signal representing an assigned value for the high voltage, said calculator being constructed to calculate a theoretical value for the parameter based on the assigned value.

13. The method according to claim 1 wherein said step of producing a response comprises maintaining operation of the high voltage generator when the differential between the at least one parameter and the second measured physical quantity is less than the predetermined minimum.

14. The method according to claim 2 wherein said step of producing a response comprises maintaining operation of the high voltage generator when the differential between the at least one parameter and the at least one physical quantity is less than the predetermined minimum.

15. The installation according to claim 3 wherein said means for controlling the magnitude of the high voltage are connected to cause said means for producing a high voltage to continue to produce the high voltage in response to the input signal when the at least one parameter differs from the at least one measured physical quantity by less than a predetermined amount.

16. In a method for generating a high voltage for electrostatically charging a coating product, which method includes converting an input voltage into an output voltage which is higher than the input voltage and constitutes the high voltage, by means of a transformer unit composed of an input transformer and a voltage multiplier connected to receive current from the input transformer, the voltage multiplier having a voltage gain, $K_3$, and in which the high voltage has an assigned desired value, $U_{des}$, the improvement comprising verifying proper generation of the high voltage by determining the relation between at least one calculated parameter, $U_{Tcalc}$, and at least one measured physical quantity representative of the high voltage, wherein:

$$U_{Tcalc} = (U_{des} + K_2 \times I_{HT})/(K_1 \times K_3),$$

where:

$K_1$ is a numerical coefficient dependent on the characteristics of the input transformer;

$K_2$ is a constant numerical coefficient characteristic of the type of voltage multiplier; and $I_{HT}$ is the current through the voltage multiplier.

17. The method according to claim 16 wherein the input transformer is supplied with a periodic voltage having a frequency, f, the voltage multiplier comprises a plurality, N, of voltage doubler stages and contains a plurality of capacitors each having a capacitance, c, and $$K_2 = \frac{(2/3 N^3 + 1/2 N^2 - 1/6 N)}{f \times c}.$$

* * * * *